United States Patent
Som et al.

(10) Patent No.: US 10,866,747 B2
(45) Date of Patent: Dec. 15, 2020

(54) SECURING A MEMORY DRIVE

(71) Applicant: HEWLETT PACKARD ENTERPRISE DEVELOPMENT LP, Houston, TX (US)

(72) Inventors: Sukhamoy Som, Houston, TX (US); David F. Heinrich, Tomball, TX (US); Theodore F. Emerson, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/429,288

(22) Filed: Jun. 3, 2019

(65) Prior Publication Data

US 2020/0257460 A1 Aug. 13, 2020

Related U.S. Application Data

(60) Provisional application No. 62/803,575, filed on Feb. 10, 2019.

(51) Int. Cl.
*G06F 3/06* (2006.01)
*G06F 13/16* (2006.01)
(Continued)

(52) U.S. Cl.
CPC .......... *G06F 3/0622* (2013.01); *G06F 3/0653* (2013.01); *G06F 3/0659* (2013.01);
(Continued)

(58) Field of Classification Search
CPC .... G06F 3/0622; G06F 3/0653; G06F 3/0659; G06F 3/0973; G06F 13/4282; G06F 13/1668; G06F 21/50
See application file for complete search history.

(56) References Cited

U.S. PATENT DOCUMENTS 5,509,136 A * 4/1996 Korekata ................ G06F 13/18
711/150
6,678,799 B2 * 1/2004 Ang ..................... G06F 12/0817
711/133
(Continued)

FOREIGN PATENT DOCUMENTS

| CN | 105489246 A | 4/2016 |
|---|---|---|
| CN | 107145362 A | 9/2017 |
| WO | 2017/131671 A1 | 8/2017 |

OTHER PUBLICATIONS

Micron Technology, Inc., "Nonvolatile Memory Security," 2019, pp. 1-8 (online), Retrieved from the Internet on Jan. 7, 2019 at URL: <micron.com/products/nonvolatile-memory-security>.

(Continued)

*Primary Examiner* — Ramon A. Mercado
(74) *Attorney, Agent, or Firm* — Nolte Intellectual Property Law Group

(57) ABSTRACT

An arrangement for securing a memory device of a computing system in which a memory access command is compared to each command in a list of commands. The command, with specified attributes, is authenticated when the command and its attributes match an entry in the list of commands. Following authentication, the command is evaluated according to usage and behavior metrics in order to identify and prevent unauthorized or malicious access of the memory device. If no violation of usage or behavior metrics is detected, the command may be issued to the memory device for execution.

20 Claims, 10 Drawing Sheets

(51) Int. Cl.
*G06F 13/42* (2006.01)
*G06F 21/60* (2013.01)

(52) U.S. Cl.
CPC ........ *G06F 3/0673* (2013.01); *G06F 13/1668* (2013.01); *G06F 13/4282* (2013.01); *G06F 21/60* (2013.01)

(56) References Cited

U.S. PATENT DOCUMENTS

| | | | | |
|---|---|---|---|---|
| 8,219,724 | B1* | 7/2012 | Caruso | G06F 3/0604 |
| | | | | 710/36 |
| 8,375,151 | B1* | 2/2013 | Kan | G06F 3/0659 |
| | | | | 710/24 |
| 8,504,760 | B2 | 8/2013 | Lee et al. | |
| 9,609,010 | B2* | 3/2017 | Sipple | H04L 63/1425 |
| 10,496,290 | B1* | 12/2019 | Visvanathan | G06F 12/0868 |
| 2005/0015686 | A1* | 1/2005 | Atoji | G06F 11/263 |
| | | | | 714/100 |
| 2005/0141336 | A1* | 6/2005 | Fischer | G11C 7/1045 |
| | | | | 365/233.5 |
| 2006/0149896 | A1 | 7/2006 | Chang et al. | |
| 2006/0282634 | A1* | 12/2006 | Ohtsuka | G06F 3/0659 |
| | | | | 711/167 |
| 2009/0006795 | A1* | 1/2009 | Bress | G06F 12/1416 |
| | | | | 711/163 |
| 2009/0070527 | A1* | 3/2009 | Tetrick | G06F 12/0888 |
| | | | | 711/113 |
| 2010/0077138 | A1* | 3/2010 | Bauernfeind | G11B 19/122 |
| | | | | 711/104 |
| 2010/0077175 | A1* | 3/2010 | Wu | G06F 3/0611 |
| | | | | 711/172 |
| 2010/0235599 | A1* | 9/2010 | Akagawa | G06F 3/0605 |
| | | | | 711/163 |
| 2014/0189226 | A1* | 7/2014 | Seo | G11C 11/40622 |
| | | | | 711/105 |
| 2014/0269069 | A1 | 9/2014 | D'abreu et al. | |
| 2016/0103626 | A1* | 4/2016 | Hars | G06F 3/0673 |
| | | | | 711/103 |
| 2016/0179392 | A1* | 6/2016 | Suto | G06F 11/3485 |
| | | | | 711/103 |
| 2016/0313944 | A1* | 10/2016 | Hodgdon | G06F 3/0647 |
| 2018/0075236 | A1* | 3/2018 | Kwon | G06F 3/0634 |
| 2018/0188970 | A1* | 7/2018 | Liu | G06F 3/0659 |
| 2018/0322069 | A1* | 11/2018 | Heinrich | G06F 12/1416 |
| 2019/0121558 | A1* | 4/2019 | Lee | G06F 3/0653 |
| 2019/0384521 | A1* | 12/2019 | Patel | G06F 3/0647 |

OTHER PUBLICATIONS

Andrew Regenscheid, "Platform Firmware Resiliency Guidelines", Draft NIST Special Publication 800-193, National Institute of Standards and Technology, May 2017, 47 pages.

Bartheungens, "Why HPE Gen10 Hardware and its Silicon Root of Trust is a Game Changer in the Server World", available online at <http://www.bitcon.be/why-hpe-gen10-hardware-and-its-silicon-root-of-trust-is-a-game-changer-in-the-server-world/>, Nov. 9, 2017, 5 pages.

Bryan Kelly, "Project Cerberus Security Architecture Overview Specification", Open Compute Project, Microsoft Corporation, Sep. 28, 2017, 17 pages.

Ian Cutress, "Hot Chips 2018: Google Titan Live Blog", available online at <https://www.anandtech.com/show/13248/hot-chips-2018-google-titan-live-blog-6pm-pt-1am-utc>, Aug. 20, 2018, 11 pages.

* cited by examiner

100

200

US 10,866,747 B2

SECURING A MEMORY DRIVE

CROSS-REFERENCE TO RELATED APPLICATION

This application claims the benefit under 35 U.S.C. 119(e) of U.S. Provisional Application No. 62/803,575 filed Feb. 10, 2019.

BACKGROUND

A flash read-only memory (ROM) device is a non-volatile, electrically erasable and reprogrammable memory chip used for mass storage and secondary storage of data, among other uses. The flash ROM device may store information that allows a computer system to operate. For example, a flash ROM device may be used to store the basic input/output system (BIOS) for a computer system, basic system configuration information, and other sensitive data.

BRIEF DESCRIPTION OF THE DRAWINGS

The examples of the present techniques are better understood by referring to the following detailed description and the attached drawings, in which.

DETAILED DESCRIPTION

Figure 1A:
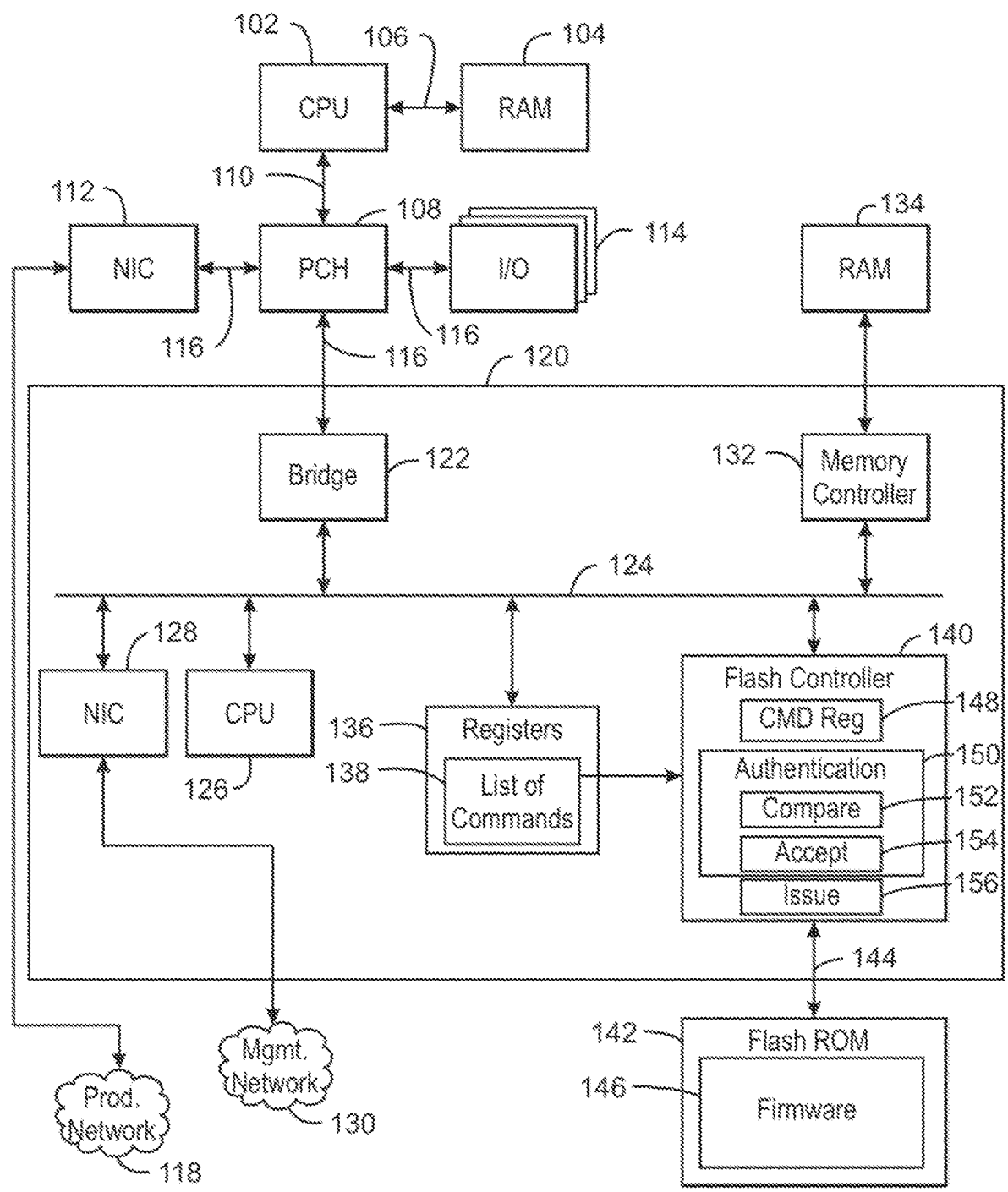
FIG. 1A is a block diagram of an example computing system in accordance with the present disclosure.

A flash read only memory (flash ROM) may be found in various devices such as servers, personal computers, digital cameras, flash drives, and other types of computing devices and systems. Flash ROM devices are generally used to store basic firmware (e.g., comprising machine-readable instructions) and configuration files. For example, a flash ROM device may store the basic input and output system used to boot an operating system (OS) of a computing device and provide other operating services after booting the OS, such as low level access to interfaces to other devices.

Accordingly, the sensitive nature of the data that may be stored in the flash ROM may make the computer system vulnerable to accidental corruption or intentional attack. For example, a problem during the updating of the BIOS in a flash ROM, such as a power failure during data transfer, may lead to the corruption of the data in the flash ROM. This may make the computer system non-functional. Other possible problems could be caused by programs issuing commands to a controller for the flash ROM that have illegitimate WRITE commands, WRITE commands for illegitimate address ranges, and the like. Further, commands from malicious code may attempt to insert code to allow remote access to the computer system and its data.

Flash ROM devices are often considered difficult to secure from user modification since there is no way for the device to discern between authorized and non-authorized accesses. Existing protection methods typically lock the device or region from any modifications, making it impossible for authorized and desired changes to occur. Flash ROM devices are often considered difficult to secure from user modification since the ability of trusted entities to modify desired regions of the memory may be desirable. Further, security features that may exist may not be standardized and thus, may be implemented differently by various vendors.

A further technological vulnerability of flash ROM devices stems from an inherent limitation upon the number of times that any sector of a flash ROM device can undergo WRITE/PROGRAM or ERASE operations before the device is rendered inoperable. For so-called "NOR flash" memories, in which cells are connected in parallel to the bit lines, allowing cells to be read and programmed individually, and where the parallel connection of cells resembles the parallel connection of transistors in a CMOS NOR gate, each sector of a flash ROM may tolerate only on the order of perhaps one hundred thousand WRITE/PROGRAM or ERASE operations during its operational lifetime, or even fewer operations for less robust device implementations. For so-called "NAND flash" memories, in which memory cells are connected in series, resembling a CMOS NAND gate, the tolerances are substantially lower, capable of undergoing only on the order of a few thousand WRITE/PROGRAM or ERASE cycles during their lifetime. Such limitations may not pose a significant problem in the context of normal lifetime operating demands, even for relatively demanding use-cases, such as in development systems that may be subjected to especially frequent firmware updates. However, intentional and/or malicious code (sometimes referred to as "malware") might be surreptitiously activated to issue a sufficient number of WRITE/PROGRAM or ERASE commands in a software loop to cause premature failure of the flash ROM. Such malicious code may be deployed in a background mode of execution, for example, thereby eluding detection before irreparable damage is done. For systems such as critical network servers and the like, unanticipated and unexpected failures may have highly undesirable consequences.

Examples described herein may provide protection to data in flash ROMs from unauthorized access, incorrect commands, or malicious attacks. The protection includes comparing commands and parameters issued for a flash ROM to a list of commands and command attributes that are allowed for the flash ROM. If a command and/or its attributes is not allowed, the command is rejected without being sent to the flash ROM. In one example, the list of allowable commands is stored in registers in an application-specific integrated circuit (ASIC) that includes the flash ROM controller. The protection further includes evaluation of usage and behavioral patterns of flash ROM accesses, in order to identify and prevent the unintentional or malicious disabling of flash ROM devices. Usage and behavior metrics may be defined and utilized to distinguish between permissible and impermissible patterns of flash memory access. Application of such metrics may protect systems including flash ROM devices from deliberate or unintentional attacks.

In this description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The terms "computer," "computing system," and "computing resource" are generally intended to refer to at least one electronic computing device that includes, but is not limited to including, a single computer, virtual machine, virtual container, host, server, laptop, and/or mobile device, or to a plurality of electronic computing devices working together to perform the function(s) described as being performed on or by the computing system. The terms also may be used to refer to a number of such electronic computing devices in electronic communication with one another.

The term "non-transitory storage medium" refers to one or more non-transitory physical storage media that together store the contents described as being stored thereon. Examples may include non-volatile secondary storage, read-only memory (ROM), flash memory, and/or random-access memory (RAM). Such media may be optical or magnetic.

The terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

The term "metric" as used herein refers to a system or standard for measurement, and in particular to a construct by which something may be evaluated. Often, a metric may be defined in terms of quantifiable parameters, and a given subject of consideration may be susceptible to evaluation according to any number of metrics, defined in terms of one or more relevant parameters. For example, in order to evaluate and describe a pattern of accesses to a flash memory device, one metric may be a "usage frequency metric" defined as a function of the number of accesses occurring during a specified period of time. A metric may further be defined as a function of or in relation to one or more reference values, which are values to which a computed metric value can be compared. In the case of the above-described "usage frequency metric," for example, one associated reference value may represent a number of accesses defining whether a "violation" of the metric has occurred. The duration of the specified period of time would be an additional reference value associated with the "usage frequency metric."

As a further example, a "behavior metric" for evaluating and describing patterns of access to a flash memory device may be defined in terms of relationships between successively accessed memory locations. Among the parameters used for computation of such a metric, historical data reflecting access behavior over a preceding time period may be utilized. Another behavior metric applicable to patterns of flash memory accesses may be defined as a function of a degree or extent of deviation an access pattern exhibits relative to an expected access pattern. Again, such a metric may be defined in terms of parameters reflecting historical access information, and metric reference parameters may be specified to determine whether a computed metric constitutes a metric violation.

It is to be noted that in the foregoing examples, both usage metrics and behavior metrics (collectively, "access metrics") may be defined as functions of variable temporal (i.e., time-related) and/or quantified parameters, utilized to compute values for comparison against metric reference values in order to identify metric violations. Some metrics may be defined entirely or predominantly in terms of quantifiable parameters, while other metrics may be less susceptible to purely quantifiable definition but may nevertheless be expressed in a form which admits to comparison with specified reference parameters.

Although the examples described herein discuss techniques relative to flash ROMs, the techniques are not limited to flash ROMs. It can be understood that the techniques may also be used to secure other memory devices, including, for example, random access memories, solid state drives, hard drives, and the like. In these examples, the list of commands and command comparison circuitry may reside, for example, in a memory controller, a drive controller, or other low level circuitry.

FIG. 1A is a block diagram of an example computing system 100 in accordance with the present disclosure. The computing system 100 may be a server, a personal computer, a tablet computer, a digital camera, a smartphone, or the like. The computing system 100 may include a central processing unit (CPU) 102. The CPU 102 can be a single core processor, a multicore processor, a processor cluster, or other types of CPUs. The CPU 102 may execute instructions stored in a memory, such as a random access memory (RAM) 104 connected to the CPU 102 via a RAM interface bus 106, such as double data rate 3 (DDR3), or DDR4 or the like. The RAM 104 may include one or more RAM devices, RAM memory modules, including without limitation dynamic random access memory (DRAM) devices or modules, or static random access memory (SRAM) devices or modules, among other memory devices.

The CPU 102 may be coupled to a platform controller hub (PCH) 108, Southbridge, or other controller hub, through an interconnect 110 that may vary based on CPU vendor and implementation specifics. Examples of the interconnect 110 can include proprietary interconnects such as the INTEL direct media interface (DMI), or through standard interconnects such as HyperTransport or Peripheral Component Interconnect Express (PCIe), among others.

The PCH 108 includes an integrated circuit, or a chipset, that manages the data flow between the CPU 102 and other internal or external hardware devices of the system 100. The PCH 108 may allow the CPU 102 to access a network interface controller (NIC) 112 and input/output (I/O) devices 114, for example, on any number of types of interconnects 116. Through the NIC 112, the CPU 102 may access a production network 118 for normal server and data functions, such as database access, providing data, and the like.

The PCH 108 may also couple the CPU 102 to circuitry that performs system management functions, such as a baseboard management controller (BMC) 120, through an interconnect 116. The interconnect 116 may include any number of interconnects over any number of widths. The BMC 120 may include an application-specific integrated circuit (ASIC), a cluster of ASICs, a single board system, or any number of other configurations. In the example shown in FIG. 1 the BMC 120 is a single ASIC. The BMC 120 may provide a number of basic management utilities for the system, including proprietary functions in accordance with the integrated lights out (iLO) system, and functions defined by other standards, such as intelligent platform management interface (IPMI), desktop and mobile architecture for system hardware (DASH) or alert standard format (ASF) platform management specifications, among others. In accordance with the standards, the BMC 120 can perform a range of system services such as monitoring physical variables of the computing system 100, for example, temperature, power-supply voltage, and operating system functions. Further, the BMC 120 may provide other management functions for the computing system 100 such as remote KVM (keyboard video mouse), virtual media, among others.

The BMC 120 may include a bridge 122 to couple to the interconnect 116 from the PCH 108. The bridge 122 may function as an interface between the interconnect 116 and an internal bus 124. The internal bus 124 may include any number of configurations, such a serial bus, a parallel bus, or high speed interconnects that couple different logic blocks, e.g., circuits on a single die or multiple dies, together.

The BMC 120 may include a BMC CPU 126. The BMC CPU 126 may execute code to support functions for the BMC 120. As an example, the BMC CPU 126 may be instructed to obtain and temporarily save an update for BIOS code to be implemented at a later time. The BMC CPU 126 may use a network interface controller (NIC) 128 in the BMC 120 to obtain the updated BIOS code from a management network 130. A memory controller 132 may be used to store the temporary copy of the BIOS code to RAM 134 that is coupled to the BMC 120.

Further, the BMC CPU 126 may be used to assist with the functions described in examples, herein, such as confirming that a command fits an authorized command template. In other examples, the comparison function may be performed by hard coded circuitry, for example, in a flash controller.

The BMC 120 may include registers 136 that may be used to store a list of commands 138. The list of commands 138 may include commands that a memory controller such as flash memory controller 140 is authorized to issue to a flash ROM 142 over a communications link, such as a Serial Peripheral Interface (SPI) bus 144. The SPI protocol is a high speed, four-wire, serial communications protocol that can be used to reduce on-board wire routing by replacing a traditional parallel bus with a serial interface and to simultaneously transfer data in both directions. It is to be understood that although the SPI bus 144 is described in the present examples, other bus protocols can be used to operatively connect the BMC 120 and the flash ROM 142. For example, the commands may include a command type, such as a WRITE, and parameter values, such as a chip select, a start address defining the beginning of a range of authorized addresses, an end address, defining the end of a range of authorized addresses. In this example, the flash ROM 142 holds the BIOS, or firmware 146, that is used to boot the computer system 100, and to provide low level interface code for some I/O devices 114.

The BMC 120 may operate in two modes. In a direct mode, initiated at power on, the CPU 102 performs a read cycle to an address that corresponds to a memory range in the flash ROM 142. The flash memory controller 140 translates the read requests into commands, for example, SPI logic can convert the read cycle to a FAST READ SPI cycle to the flash ROM 142. During the booting process, the registers 136 may be loaded with the list of commands 138, for example, from the flash ROM 142. In some examples, the registers 136 may be preprogrammed with the list of commands 138. In other examples, the list of commands 138 may be hard coded into circuitry in the BMC 120.

During the booting process or once the booting process is finished, the second mode for accessing the flash ROM 142 becomes possible. This mode, termed manual mode, allows commands to be sent to the flash memory controller 140, e.g., loaded to the command register 148, for accessing the flash ROM 142. In some examples described herein, a write protect bit in a control register in the BMC 120 may be set to indicate that commands in the command register 148 are to be checked against the list of commands 138 before the commands are issued to the flash ROM 142. This prevents accessing the flash ROM 142 using commands that are not on the list or with parameters that may cause problems, such as corruption of data or insertion of malware code into the firmware 146.

The CPU 102 may attempt to manually access memory addresses that are in the flash ROM 142, for example, by loading a WRITE command and address range to the command register 148. Authorization circuitry 150 in the flash memory controller 140 may include a command comparator 152 that compares the command in the command register 148 to each of the authorized commands in the list of commands 138. If the command matches one of the authorized commands, including a correct address range and other parameters, a command acceptor 154 may pass the command to a command issuer 156, for example, an SPI controller, to be sent to the flash ROM 142. If the command in the command register 148 does not match any of the authorized commands, or includes incorrect parameters, the accept module may reject the command, for example, by returning an error to the CPU 102.

As an example, if the BMC CPU 126 were to attempt to update the flash ROM 142 with an update to the firmware 146, it may write data from a temporary copy of the firmware 146 stored in the RAM 134 associated with the BMC 120 to the flash ROM 142. However, if the WRITE command has an incorrect or corrupted address, the firmware 146 may be overwritten with corrupted or invalid data. For example, if the address range is larger than the flash ROM 142 can store, or starts at a point that will not hold the data before running out of memory space, the outcome may be unpredictable. Comparing the command and the parameters to the list of commands 138 in the registers 136 may protect the contents of the flash ROM 142. Further, if a command has a valid address range, but is issued to a flash ROM 142 in an invalid manner, it may allow malicious software to access the flash ROM 142. This may be prevented by including the manner of the command issue in the list of parameters for the command.

The computer system 100 is not limited to the blocks or systems shown in FIG. 1. For example, any number of interface types may be used to access the flash ROM 142 instead of, or in addition to, the SPI protocol. Further, the techniques described herein may be implemented directly in a memory or disk controller, without using a BMC 120. For example, a command list may be implemented in a disk controller to protect certain regions of a hard drive from being overwritten. This may be used to protect operating systems, and the like.

The booting of the CPU 102 may occur in tandem with the booting of the BMC 120. For example, this may be performed to load the authorized command table. In one example, the BMC 120 boots from the flash ROM 142 in the same way the host does. The BMC CPU 126 issues bus cycles that are converted to SPI read commands and issued to the flash ROM 142 by the flash memory controller 140. After the BMC 120 boots, it then identifies the attached flash ROM 142 and additional devices. Then based on the type and manufacturer of the devices it populates the list of commands 138 in the registers 136. The BMC 120 then locks the table, so that the attached ROM devices may only accept acceptable commands from either the host CPU 102 or the BMC 120. After this is completed, the system 100 is allowed to boot, issuing code reads to the attached flash ROM 142 or ROMs using direct mode.

Figure 1B:
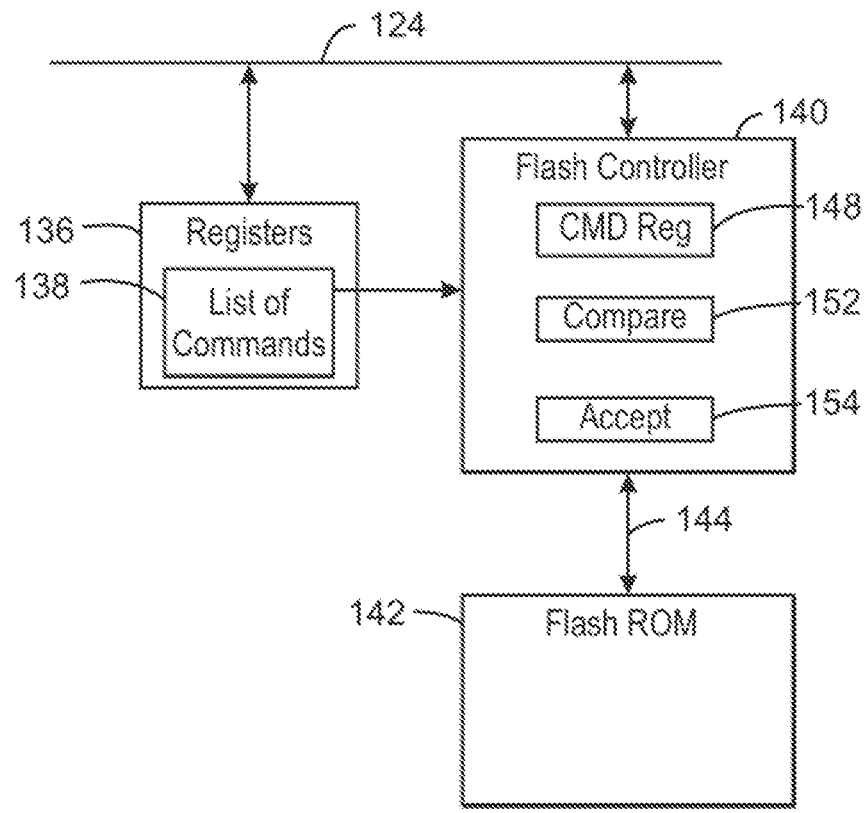
FIG. 1B is a block diagram of another example computing system in accordance with the present disclosure.

Not every block shown in FIG. 1A may be used in every example, as described with respect to FIG. 1B. Further, additional blocks, such as multiple flash ROMs, or other memory devices, may be used.

FIG. 1B is a block diagram of another example computing system 100 in accordance with the present disclosure. In this block diagram, the computing system 100 is simplified to clarify the blocks that may be used to perform the functions described herein.

Figure 2:
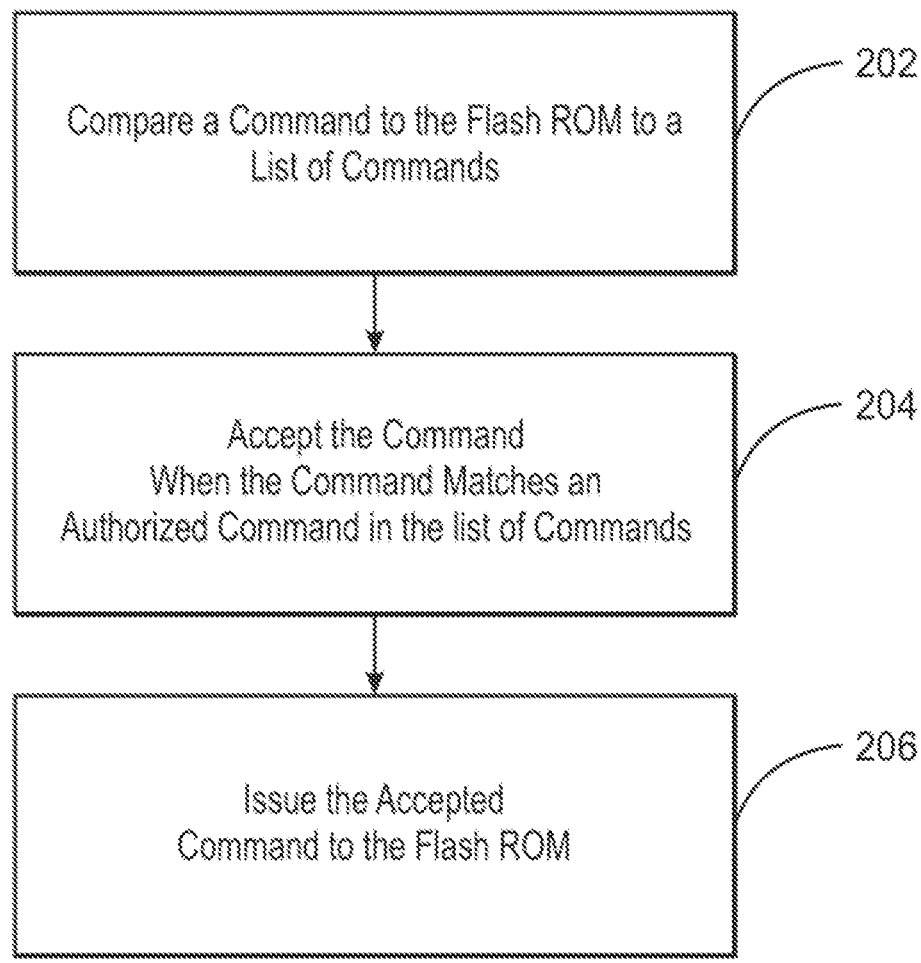
FIG. 2 is a process diagram of an example method for securing a flash memory device of the example computing system of FIG. 1 in accordance with the present disclosure.

FIG. 2 is a process diagram of an example method 200 for securing a flash memory device of the example computing system of FIG. 1 in accordance with the present disclosure. A list of commands may be located in registers of a flash controller, a memory controller, or a disk controller. In various examples, the commands may include about 20 commands, or about 32 commands, or more, depending on the system and the protection needed.

At block 202, the command in the command register is compared to the list of commands in the registers. An example of a simplified code segment that may perform the comparison is shown below. It can be understood that many more parameter comparisons may be performed than shown in the simplified code segment.

Command            Allowed=Valid              &
    ((Command==SPIAUTHCC.Command) &&
      ((ChipSel==SPIAUTHCC.ChipSel)   &&   SPIAU-
    THCQ.CSCmpEn) &&
      ((DataDir==SPIAUTHCC.DataDir) && SPIAUTHCQ.
    DataDirEn) &&
      ((DataWidth==SPIAUTHCC.DataWidth)   &&   SPIAU-
    THCQ.DataWidthEn) &&
      ((Addy>=SPIAUTHAS)          &&          SPIAU-
    THCQ.AddrCmpEn) &&
      (((Addr+Count)<=SPIAUTHAE)     &&     SPIAU-
    THCQ.AddrCmpEn) &&
      ((Count<SPIAUTHDC)         &&         SPIAUTHCQ.
    CountCmpEn))

In the code segment, SPIAUTHCC is a pointer to the registers that hold the list of commands, while each of the terms after SPIAUTHCC indicate pointers to particular bit ranges in the registers that can hold the authorized commands and a list of authorized parameters that are associated with the command. Other pointers in the code segment point at other authorized attributes, including a pointer to a register including flags, SPIAUTHCQ, which indicate whether a particular parameter is to be compared. Additional pointers that may be used include SPIAUTHAS, which indicates an authorized starting address for the command, SPIAUTHAE, which indicates an authorized ending address for the command, and SPIAUTHDC, which indicates an authorized number of bytes or other data units, that may be used.

The first determination is whether the command itself is authorized, as determined by the comparison "Command==SPIAUTHCC.Command." If this is FALSE, e.g., indicating a non-authorized command, the rest of the associated parameters may be compared, as shown in succeeding lines, but the overall expression defaults to FALSE. If the first comparison is TRUE, the overall value for the expression is determined by the remaining comparisons, which determine if the parameters are authorized.

Each parameter comparison includes two elements, the parameter value comparison, and a parameter enable bit that indicates whether the comparison should be ignored. For example, "(DataDir==SPIAUTHCC.DataDir) && SPIAUTHCQ.DataDirEn" is a comparison to determine whether the command is limited to a particular data direction, "DataDir." The second portion of the comparison, e.g., "SPIAUTHCQ.DataDirEn" is a pointer to a bit flag that determines whether the comparison will be performed, e.g., default to FALSE. Examples, of other comparisons that may be performed include chip select, "ChipSel", address ranges, "Addy", data counts, "Count", and many others not shown in this list. For example, the length of a command may be used to determine if the command is valid. This may block commands that have malicious sequences appended.

As an example, a BLOCK ERASE command or a READ Command may be sent to a command register for a flash ROM. The BLOCK ERASE command may delete data from the flash ROM and the READ command may retrieve data from the flash ROM. However, before the commands are issued to the flash ROM, the comparison is used to determine whether the transmitted commands are authorized.

For example, the BLOCK ERASE or READ command may be compared to the list of commands, for example, in registers 136. In this example, the BLOCK ERASE command may fail to match one of the commands in the list of commands. Thus, the BLOCK ERASE command may be rejected, and an error returned to the unit that attempted the command.

By comparison, the READ command may be on the list of commands, indicating that it is an authorized command. Further, the address range for the READ may match the parameters associated with the READ command in the registers. Accordingly, the READ command may be issued to the flash ROM, allowing the contents of the memory locations to be accessed and read back.

At block 204, if the transmitted command matches an authorized command, including the parameters, the command may be deemed authenticated, and thereafter subjected to evaluation in flash usage and behavior monitor circuitry, prior to being accepted and sent to the flash ROM 142. At block 206 the flash controller may issue the accepted command to the flash ROM, which implements the command, for example, providing the contents of a sequence of memory locations back to a CPU.

Figure 3:
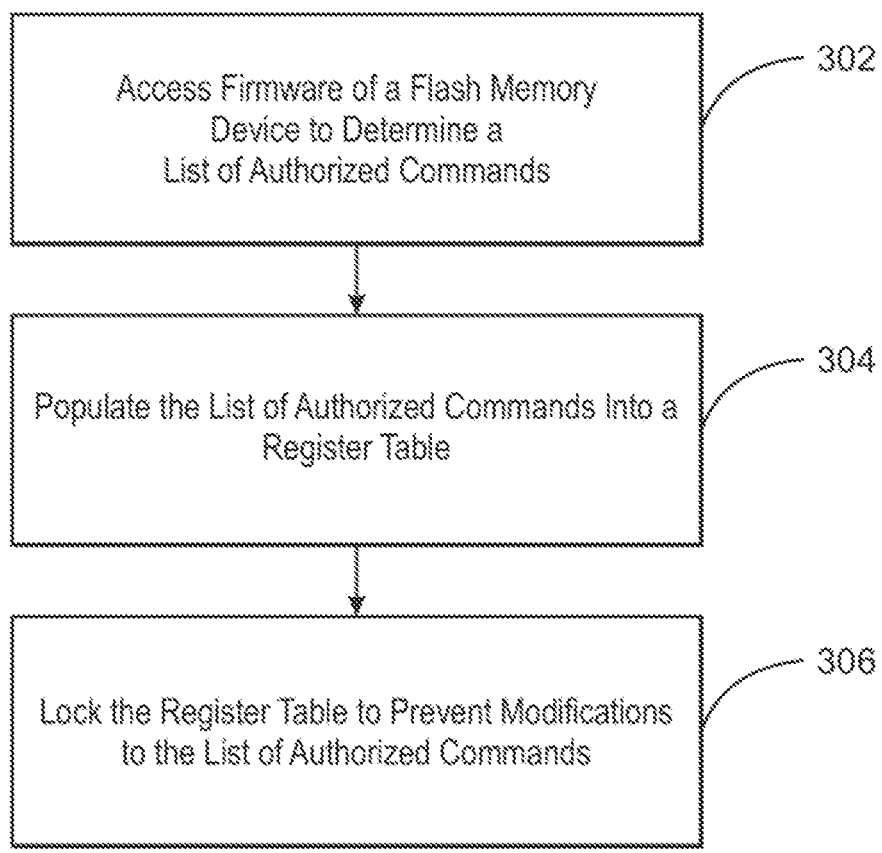
FIG. 3 is a process diagram of an example method for populating a register table located in a management controller of a computing system in accordance with the present disclosure.

FIG. 3 is a process diagram of an example method 300 for populating a register table located in a management controller of a computing system in accordance with the present disclosure. At block 302, during a boot sequence, a CPU may access the firmware to locate and read the list of commands. At block 304, the commands are written to registers, or other storage, in a BMC, memory controller, disk controller, or other unit. At block 306, the registers may be locked, for example, by setting a bit flag, to prevent modifications to the list of authorized commands. As described herein, the list of authorized commands may be preprogrammed into registers in a BMC, PROM, or other ASIC during manufacturing, preventing modification of the list of authorized commands. Similar benefits may be obtained by hard coding the list of authorized commands into logic blocks within a BMC or other ASIC, for example, as a design parameter implemented during fabrication of the ASIC. The bit flag may be set to enforce immutability of the data in the registers. For example, if the bit flag is set, modification of the registers may be prevented until after the management controller is reset.

Figure 4:
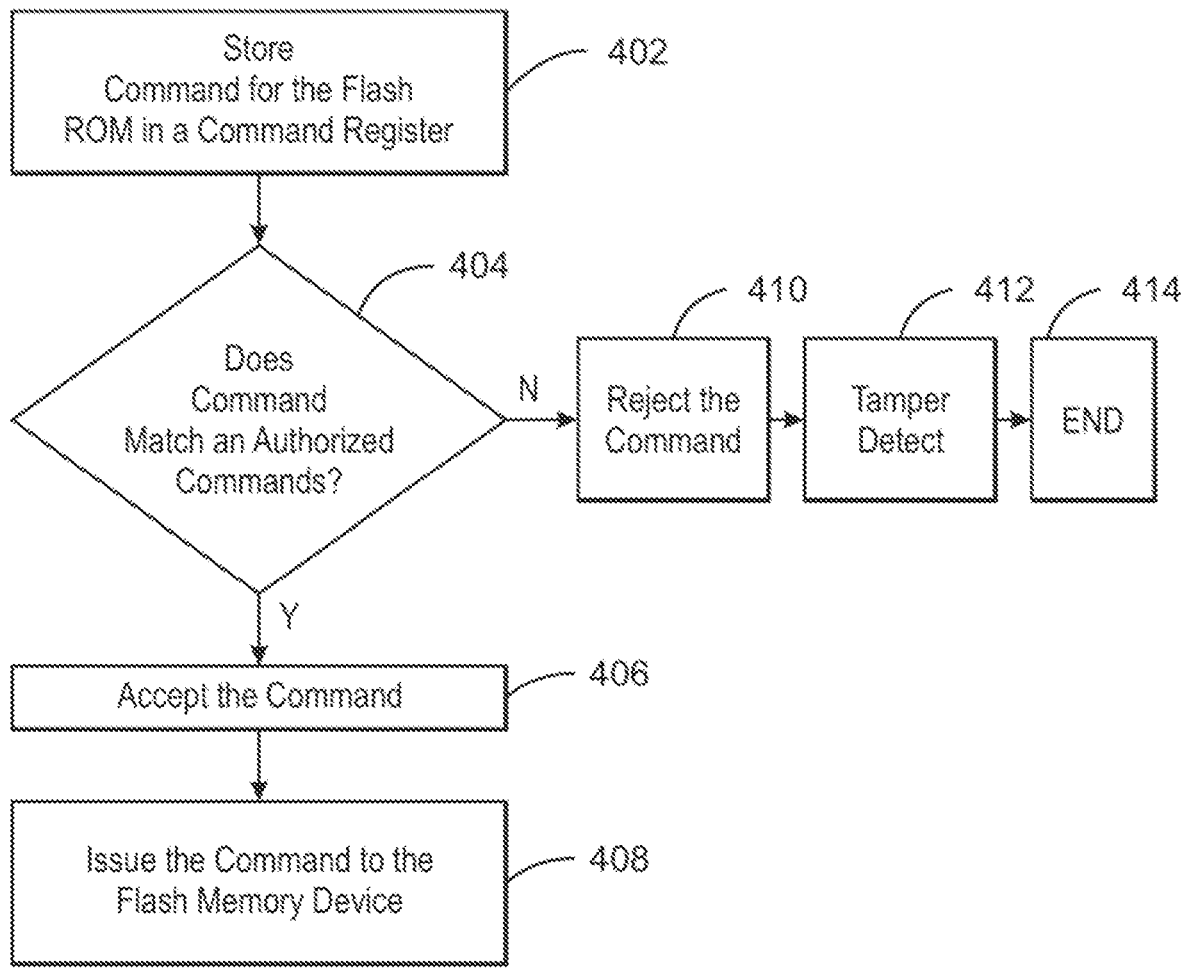
FIG. 4 is an example flow chart of operations related to accessing data on a flash memory device in accordance with the present disclosure.

FIG. 4 is an example flow chart 400 of operations related to accessing data on a flash memory device in accordance with the present disclosure. A list of authorized commands may limit unauthorized access and malicious attacks on the flash memory device. This list of authorized commands may populate registers, for example, in a BMC or other memory or disk controller. The registers may be locked to prevent modifications of the list of commands or their parameters.

At block 402, a command for the flash ROM may be sent to a flash controller, for example, being storing in a command register in the flash controller. In some examples, the command may be sent by malevolent or malfunctioning code and thus, may not be issued to the flash ROM. At block 404, a flash controller, BMC CPU, or other hardware, may determine whether the command in the command register matches an authorized command from the list of commands. This includes determining if the parameters for the command are in acceptable ranges. If there is a match, then at block 406, the flash controller may accept the command. The accepted command, at block 408, may be issued to the flash ROM.

If there is no match between the command and the list of commands at block 404, the flash controller may reject the command at block 410, as an illegal command. After rejecting the illegal command, the flash controller may provide a status to the CPU, a BMC CPU, or other units at block 412, by issuing a tamper detection notification. The tamper detection notification may include an error signal returned to a CPU, or may be a series of signals, such as an error signal to a CPU and a tamper detection alert to a BMC CPU, among others.

Further, tamper detection firmware may take corrective actions to address the unauthorized command. In some examples, an attempted unauthorized command may be logged in order to carry out analyses. The logged commands may be used to indicate faulty or malevolent code. After rejection, the method ends at block 414.

Figure 5:
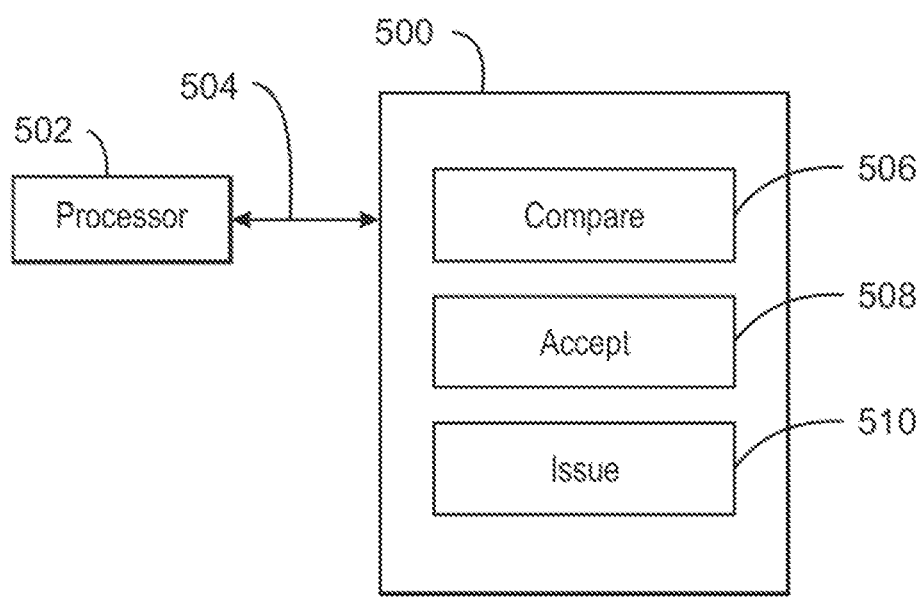
FIG. 5 is a block diagram showing an example tangible, non-transitory, computer-readable medium that stores code configured to secure a flash memory device in accordance with the present disclosure.

FIG. 5 is block diagram showing an example tangible, non-transitory, computer-readable medium 500 that stores code configured to secure a flash memory device in accordance with the present disclosure. As described herein, this may be in a ROM associated with the BMC CPU. In some embodiments, the code is hard wired into logic circuits of a BMC or other ASIC, or a memory or disk controller. The computer-readable medium 500 may include the flash ROM 142 of FIG. 1. The computer-readable medium 500 may be accessed by a processor 502, such as a BMC CPU, over a computer bus 504 and may include code configured to perform the methods described herein.

The various components discussed herein may be implemented using the computer-readable medium 500. The components may include various modules to secure and protect the flash memory device from unauthorized access and malicious attacks. The compare module 506 may compare a command stored in a command register of a flash controller to a list of commands in registers or other memory locations. Any command transmitted to the flash ROM that does not match an authorized command in the registers may be rejected and, thus, not issue to the flash ROM. Conversely, the accept module 508 may accept any transmitted command that matches a command in the registers. Once a command is deemed authorized an issue module 510 may issue it to the flash memory device to be carried out.

Figure 6:
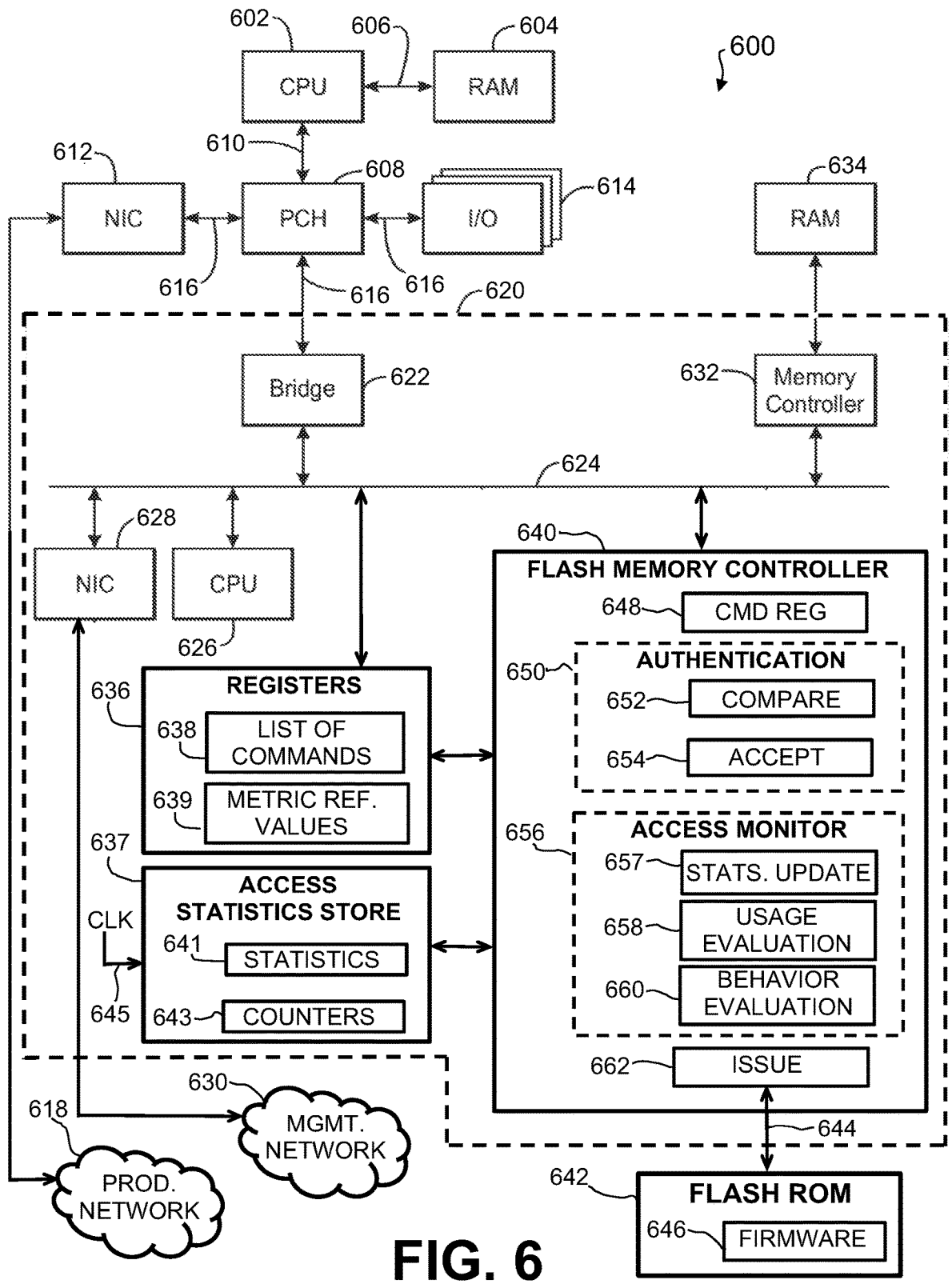
FIG. 6 is a block diagram of another example computing system in accordance with the present disclosure.

FIG. 6 is a block diagram of a further example computing system 600 in accordance with the present disclosure. The computing system 600 may be a server, a personal computer, a tablet computer, a digital camera, a smartphone, or the like. The computing system 600 may include a central processing unit (CPU) 602. The CPU 602 can be a single core processor, a multicore processor, a processor cluster, or other types of CPUs. The CPU 602 may execute instructions stored in a memory device, such as a random access memory (RAM) device 604 connected to the CPU 602 via a RAM interface bus 606, such as double data rate 3 (DDR3), or DDR4 or the like. The RAM 604 may include one or more RAM devices, RAM memory modules, including without limitation dynamic random access memory (DRAM) devices or modules, or static random access memory (SRAM) devices or modules, among other memory devices.

The CPU 602 may be coupled to a platform controller hub (PCH) 608, Southbridge, or other controller hub, through an interconnect 610 that may vary based on CPU vendor and implementation specifics. Examples of the interconnect 610 can include proprietary interconnects such as the INTEL direct media interface (DMI), or through standard interconnects such as HyperTransport or Peripheral Component Interconnect Express (PCIe), among others.

The PCH 608 includes an integrated circuit, or a chipset, that manages the data flow between the CPU 602 and other internal or external hardware devices of the system 600. The PCH 608 may allow the CPU 602 to access a network interface controller (NIC) 612 and input/output (I/O) devices 614, for example, on any number of types of interconnects 616. Through the NIC 612, the CPU 602 may access a production network 618 for normal server and data functions, such as database access, providing data, and the like.

The PCH 608 may also couple the CPU 602 to circuitry that performs system management functions, such as a baseboard management controller (BMC) 620, through an interconnect 616. The interconnect 616 may include any number of interconnects over any number of widths; one example is a PCI-E interface. The BMC 620 may include an application-specific integrated circuit (ASIC), a cluster of ASICs, a single board system, or any number of other configurations. In the example shown in FIG. 6, the BMC 620 is a single ASIC. The BMC 620 may provide a number of basic management utilities for the system, including proprietary functions in accordance with the integrated lights out (iLO) system, and functions defined by other standards, such as intelligent platform management interface (IPMI), desktop and mobile architecture for system hardware (DASH) or alert standard format (ASF) platform management specifications, among others. In accordance with the standards, the BMC 620 can perform a range of system services such as monitoring physical variables of the computing system 600, for example, temperature, power-supply voltage, and operating system functions. Further, the BMC 620 may provide other management functions for the computing system 600 such as remote KVM (keyboard video mouse), virtual media, among others.

The BMC 620 may include a bridge 622 to couple to the interconnect 616 from the PCH 608. The bridge 622 may function as an interface between the interconnect 616 and an internal bus 624. The internal bus 624 may include any number of configurations, such a serial bus, a parallel bus, or high speed interconnects that couple different logic blocks, e.g., circuits on a single die or multiple dies, together.

The BMC 620 may include a BMC CPU 626. The BMC CPU 626 may execute code to support functions for the BMC 620. As an example, the BMC CPU 626 may be instructed to obtain and temporarily save an update for BIOS code to be implemented at a later time. The BMC CPU 626 may use a network interface controller (NIC) 628 in the BMC 620 to obtain the updated BIOS code from a management network 630. A memory controller 632 may be used to store the temporary copy of the BIOS code to RAM 634 that is coupled to the BMC 620.

Further, the BMC CPU 626 may be used to assist with the functions described in examples, herein, such as confirming that a command fits an authorized command template. In other examples, the comparison function may be performed by hard coded circuitry, for example, in a memory controller such as flash memory controller 640.

In one example, functionality of flash memory controller 640 as described herein may be achieved by dedicated hardware logic, such as with one or more application-specific integrated circuits (ASICs). In another example, functionality of flash memory controller 640 as described in various examples herein may be implemented through software executed by a microprocessor or microcontroller. Implementation of flash memory controller 640 functionality by dedicated hardware logic may reduce the likelihood that the flash memory security achieved by the various examples described herein may be circumvented through surreptitious manipulation or unauthorized alteration of executable code (i.e., malware) executed to the security functions (authentication and flash usage and behavior monitoring) of the various examples herein. Flash memory controller 640 may alternatively be implemented using a combination of dedicated hardware logic and software-controlled elements.

The BMC 620 may include registers 636 that may be used to store a list of commands 638. The list of commands 638 may include commands that flash memory controller 640 is authorized to issue to a flash ROM 642 over a communications link, such as a Serial Peripheral Interface (SPI) bus 644. The SPI protocol is a high speed, four-wire, serial communications protocol that can be used to reduce on-board wire routing by replacing a traditional parallel bus with a serial interface and to simultaneously transfer data in both directions. It is to be understood that although the SPI bus 644 is described in the present examples, other bus protocols, including, without limitation, "Quad SPI" protocols, can be used to operatively connect the BMC 620 and the flash ROM 642. For example, the commands may include a command type, such as a WRITE, and parameter values, such as a chip select, a start address defining the beginning of a range of authorized addresses, an end address, defining the end of a range of authorized addresses. In this example, the flash ROM 642 holds the BIOS, or firmware 646, that is used to boot the computer system 600, and to provide low level interface code for some I/O devices 614.

Some of registers 636 may be used to store metric reference values 639 associated with metrics defined for usage evaluation circuit 658 and behavior evaluation circuit 660. The metric reference values 639 stored in registers 636 may be utilized in the evaluation of flash memory usage and access behavior patterns according to predefined usage and behavior metrics. The metric reference values 639 in registers 636 may be defined to facilitate identifying and preventing undesirable flash memory accesses. Metric parameter reference values may be defined in terms of usage thresholds, such as, without limitation: maximum numbers of flash memory accesses allowed within specified periods of time; a minimum period of time required between two or more successive flash memory accesses; and other quantity and temporal access thresholds. Other metrics may be defined in terms of access behavior characteristics, such as, without limitation: relationships between the addresses of accessed locations in successive memory accesses; the frequency with which particular sectors of a memory is written to or erased; or the extent to which a pattern of memory accesses matches or deviates from an expected pattern in a particular context.

BMC 620 may further include an access statistics store 637 for maintaining historical statistics for memory accesses, and other data utilized to facilitate evaluation of flash memory access behavior patterns in accordance with various examples in this disclosure. Statistics compiled during operation of system 600 may be maintained in a statistics block 641 of access statistics store 637. In addition, access statistics store 637 may include one or more counters 643 for providing data reflecting quantitative and time-varying statistic, such as, for example, the relative order of received commands, running totals of access counts of various types to various memory locations, and so on. A clock (CLK) signal 645 may be provided to BMC 620 to serve as a temporal (i.e., time-related) reference. Counters 643 may also be used in conjunction with Clock signal 645 to generate temporal statistics. Clock signal 645 may also be used to provide a "time stamp" for various memory access statistics as they are recorded. In various examples, many different statistics may be compiled in access statistics store 637, depending upon the definitions of access metrics for evaluating access commands as described herein.

The BMC 620 may operate in two modes. In a direct mode, initiated at power on, the CPU 602 performs a read cycle to an address that corresponds to a memory range in the flash ROM 642. Flash memory controller 640 translates the read requests into commands, for example, SPI logic can convert the read cycle to a FAST READ SPI cycle to the flash ROM 642. During the booting process, the registers 636 may be loaded with the list of commands 638, for example, from the flash ROM 642, and metric reference values 639. In some examples, the registers 636 may be preprogrammed with the list of commands 638 and metric reference values 639. In other examples, the list of commands 638 and metric reference values 639 may be hard-coded into circuitry in the BMC 620, or provided in additional dedicated non-volatile storage (not shown in FIG. 6) separate from flash ROM 642 itself.

During the booting process or once the booting process is finished, the second mode for accessing the flash ROM 642 becomes possible. This mode, termed manual mode, allows a plurality of access commands in a sequence to be sent to flash memory controller 640, e.g., loaded sequentially into the command register 648, for accessing the flash ROM 642. In some examples described herein, a write protect bit or "lock bit" in a control register in the BMC 620 may be set to indicate that received commands in the command register 648 are to be checked against the list of commands 638 and the metrics reference values 639 before the commands are issued to the flash ROM 642. This prevents accessing the flash ROM 642 using commands that are not on the list or with parameters that may cause problems, such as corruption of data or insertion of malware code into the firmware 646.

The CPU 602 may attempt to manually access memory addresses that are in the flash ROM 642, for example, by loading a WRITE/PROGRAM command and address range to the command register 648. Authorization circuitry 650 in flash memory controller 640 may include a command comparator 652 that compares the received command in the command register 648 to each of the authorized commands in the list of commands 638. If the received command matches one of the authorized commands, including a correct address range and other parameters, a command acceptor 654 may pass the command to access monitor circuitry 656 for further evaluation of command in command register 648.

In one example, access monitor circuitry 656 functions to identify patterns of command usage and access behavior patterns of flash memory controller 640, according to one or more predefined metrics, as hereinafter described.

Assuming that a command in command register has been authenticated in authentication circuitry 650, and is determined not to violate any usage or behavior metrics established by access monitor circuitry 656, access monitor circuitry 656 may pass the command in command register 648 to a command issue circuit 662, for example, an SPI controller, to be sent to the flash ROM 642. If the command in the command register 648 does not match any of the authorized commands, or includes incorrect parameters, or is determined to violate any usage or behavior metric established by access monitor circuitry 656, flash memory controller 640 may reject the command, for example, by returning an error to the CPU 602.

As an example relating to the operation of authentication circuitry 650 to prevent undesired access to flash ROM 642, if the BMC CPU 626 were to attempt to update the flash ROM 642 with an update to the firmware 646, it may write data from a temporary copy of the firmware 646 stored in the RAM 634 associated with the BMC 620 to the flash ROM 642. However, if the WRITE command has an incorrect or corrupted address, the firmware 646 may be overwritten with corrupted or invalid data. For example, if the address range is larger than the flash ROM 642 can store, or starts at a point that will not hold the data before running out of memory space, the outcome may be unpredictable. Comparing the command and the parameters to the list of commands 638 in the registers 636 may protect the contents of the flash ROM 642. Further, if a command has a valid address range, but is issued to a flash ROM 642 in an invalid manner, it may allow malicious software to access the flash ROM 642. This may be prevented by including the manner of the command issue in the list of parameters for the command.

The computer system 600 is not limited to the blocks or systems shown in FIG. 6. For example, any number of interface types may be used to access the flash ROM 642 instead of, or in addition to, the SPI or Quad SPI protocol. Further, the techniques described herein may be implemented directly in a memory or disk controller, without using a BMC 620. For example, a command list may be implemented in a disk controller to protect certain regions of a hard drive from being overwritten. This may be used to protect operating systems, and the like.

The booting of the CPU 602 may occur in tandem with the booting of the BMC 620. For example, this may be performed to load the authorized command table. In one example, the BMC 620 boots from the flash ROM 642 in the same way the host does. The BMC CPU 626 issues bus cycles that are converted to SPI READ commands and issued to the flash ROM 642 by flash memory controller 640. After the BMC 620 boots, it then identifies the attached flash ROM 642 and additional devices. Then, based on the type and manufacturer of the devices, it populates the list of commands 638 in the registers 636 as well as the metric reference values 639 utilized by access monitor circuitry 656 in evaluating usage and behavior patterns of memory accesses. The BMC 620 then locks the table, so that the attached ROM devices may only accept acceptable commands from either the host CPU 602 or the BMC 620. After this is completed, the system 600 is allowed to boot, issuing code reads to the attached flash ROM 642 or ROMs using direct mode as described above.

Figure 7:
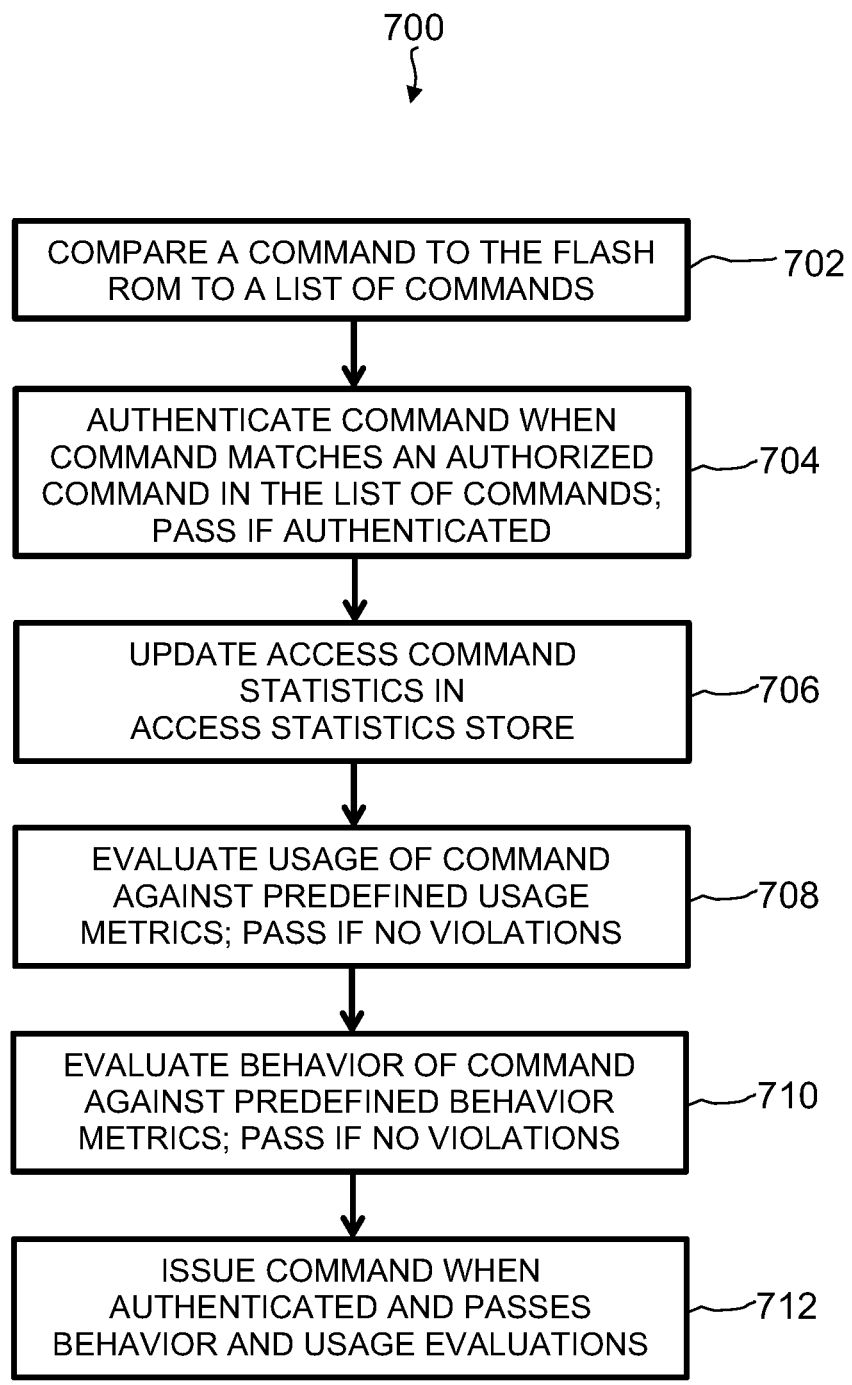
FIG. 7 is a process diagram of an example method for securing a flash memory device of the example computing system of FIG. 6 in accordance with the present disclosure.

FIG. 7 is a process diagram of an example method 700 for securing a flash memory in accordance with one or more examples. In one example, the method 700 as depicted in FIG. 7 an authentication stage and an evaluation stage. In the authentication stage, a command received into command register 648 is compared with list of commands 638 to ensure that the received command is an authorized command. Authentication of a command may include ensuring the command itself (i.e., the type of command) is listed as an authorized command in list of commands 638, and may further include ensuring that the particular attributes of the command, such as the address(es) parameters specified for the command are within a permissible range. Some address ranges may be deemed "critical" memory regions such that no access is authorized within those ranges. Other addresses or address ranges may be selectively authorized for access depending upon the command type or other command attributes. In the evaluation stage, a command may be evaluated to determine whether execution of the command is indicative of a pattern or type of behavior that is improper or malicious. Referring to access statistics maintained in usage statistics store 637, the method 700 of FIG. 7 may evaluate each command (and its attributes, such as addresses or other command parameters) in the context of one or more prior commands (and their attributes). A command may then be selectively executed or rejected in order to prevent undesirable access behavior from occurring.

With reference to FIG. 7, method 700 begins with comparison of a command received in command register 648 to a list of commands 638 in registers 636, as represented by block 702. In block 704, a command is authenticated when it is determined to match an authorized command in list of commands 638. As previously noted, authentication of a received command includes consideration of both the command type and attributes of the command, such as specified address parameters.

After authentication confirmation in block 704, in block 706 a received command is next passed to access monitor circuitry 656, which includes an access statistics updating circuit 657, a usage evaluation circuit 658, and a behavior evaluation circuit 660. Access statistics updating circuit 657 functions to store statistics relating to the received command in statistics block 641. Various access command statistics may be recorded, including, without limitation, running counts of issuances of different access command types, along with their attributes and parameters. As statistics are compiled in access statistics store, information regarding their temporal (i.e., time) relationship, either in relative terms, such as by utilizing counters 643, or in absolute or real-time terms, such as by utilizing Clock signal 645. Such additional statistical information may then be available to be utilized as part of the usage and behavior metrics applied to received commands by access monitor circuit 656.

With continued reference to FIG. 7, following updating of access statistics store 637 as represented by block 706, usage evaluation circuit 658 may evaluate the received command against one or more predefined usage metrics. In block 708, Evaluation of a received command by application of one or more usage metrics enables a determination to be made whether the received command under evaluation represents a violation of one or more predefined usage metrics, examples of which being described in further detail below.

Assuming no usage metric violation is identified in block 708, the received command next passes to behavior evaluation circuit 660 (FIG. 6) in order to evaluate the command against one or more predefined behavior metrics. In block 710 of FIG. 7, therefore, a determination is made whether the command under evaluation represents a violation of one or more predefined behavior metrics, examples of which being described in further detail below.

Assuming no behavior metric violation is identified in block 710, in block 712 the command may then be sent to issue circuit 662 (FIG. 6) for issuance to and execution by flash ROM 642.

Figure 8:
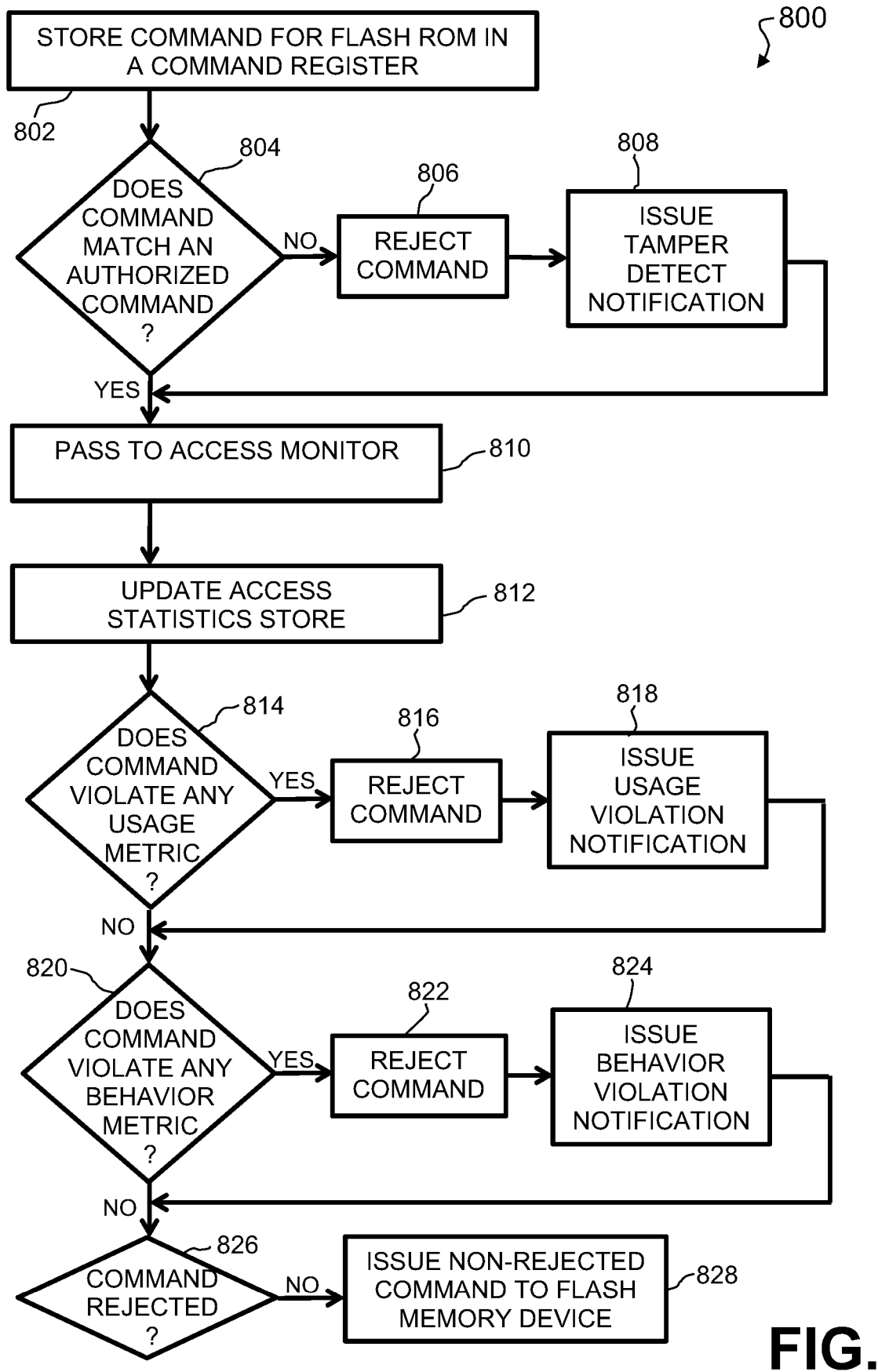
FIG. 8 is an example flow chart of operations related to accessing data on a flash memory device in accordance with the present disclosure.

FIG. 8 is a flow chart of an example method 800 for securing a flash memory device such as flash ROM 642 of the example computing system 600 of FIG. 6 in accordance with the present disclosure. A list of commands may be located in registers such as registers 636 of a flash controller (such as BMC 620), a memory controller, or a disk controller. In various examples, there may be any arbitrary number of commands, depending on the system and the protection needed. Metric reference values 639 associated with predefined behavior metrics and usage metrics may be stored in registers such as registers 636 of a flash controller, a memory controller, or a disk controller. In various examples, any arbitrary and variable number of behavior and usage parameters may be stored.

At block 802, a received command in command register 648 is compared to the list of commands 638 in the registers 636. Reference is made to a detailed example of a simplified code segment that may perform the comparison provided hereinabove in detail with reference to the example of FIGS. 1A and 1B.

A first determination at decision block 804 in flow chart 800 evaluates whether the command itself is authorized, as determined by a comparison of a requested command with the list of authorized commands, by authentication circuitry 650. Again, it is to be noted that, as specified in list of commands 638, a command may be authorized or not authorized depending both upon the type of command and upon other command attributes, such as the parameters specified for the command. For example, an access command such as a WRITE/PROGRAM command or an ERASE command may only be authorized for certain addresses or ranges of addresses, and may be unauthorized for others. That is, authorization of a command in any instance may depend upon other attributes specified with the issuance of a particular type of command. If the comparison at decision block 804 in FIG. 8 proves FALSE, e.g., indicating a non-authorized command type/attribute combination, the rest of the associated parameters may be compared, as shown in succeeding lines, but the overall expression defaults to FALSE. If the first comparison is TRUE, the overall value for the expression is determined by the remaining comparisons, which determine if the parameters are authorized.

As an example, a BLOCK ERASE command or a READ command may be sent to a command register for a flash ROM. The BLOCK ERASE command may delete data from the flash ROM and the READ command may retrieve data from the flash ROM. However, before the commands are issued to the flash ROM, the comparison is used to determine whether the transmitted commands are authorized.

For example, the BLOCK ERASE or READ command (along with attributes, such as addresses for the command) may be compared to the list of commands 638, for example, in registers 636. In this example, the BLOCK ERASE command, with specified attributes, may fail to match one of the entries in the list of commands 638. Thus, the BLOCK ERASE command may be rejected, and an error returned to the unit that attempted the command, as described below.

By comparison, the READ command with certain attributes (e.g., address(es)) may be on the list of commands 638, indicating that it is an authorized command. On the other hand, the READ command with other attributes may not be on the list of commands 638, and may therefore be rejected, as represented by block 806 in FIG. 8. Thereafter, at block 808, flash memory controller 640 may issue a tamper detect notification, such as to CPU 602 or to BMC CPU 626 in BMC 620. Following rejection of an unauthorized command in block 806 and issuance of a tamper detection notification in block 808, the received command is then passed access monitor circuitry 656, in block 810. Although the command is rejected in this case, it is nevertheless passed to access monitoring circuitry 656, since the issuance of access commands, whether or not executed, may be evidence of a pattern of access behavior to be detected in accordance with the various examples of this disclosure.

If the transmitted command is determined at block 804 to match an authorized command, including the command's attributes, the command may be deemed authenticated but in the present example is further subjected to evaluation in access monitor circuitry 656, prior to being executed. Passing of a command from authentication circuitry 650 to access monitor circuitry 656 is represented by block 810 in FIG. 8. As described herein, a flash usage and behavior monitor facilitates evaluation of commands to identify undesirable patterns of access behavior.

In particular from block 810, after a command in command register 648 has been authenticated or rejected by authentication circuitry 650, the statistics for the command are added to access statistics store 637 by statistics updating circuit 657, as represented by block 812 in FIG. 8. By maintaining and updating such usage statistics in statistics block 641 in usage statistics store 637, access monitor circuitry 656 is provided with historical access statistics which enable undesirable and/or malicious access patterns to be detected within a sequence of access commands issued to flash ROM 642.

Next, in block 814 the command is then subjected to evaluation in a usage evaluation circuit 658. Usage evaluation involves applying one or usage metrics to a received command in order to determine whether a command reflects undesirable use of flash ROM 642 during operation of system 600. What constitutes undesirable use is thus determined by the definitions of one or more usage metrics implemented by usage evaluation circuit 658, as will be hereinafter described in further detail.

If, in block 814, a received command is evaluated according to one or more usage metrics and a violation of a usage metric is determined to have occurred, the received command is rejected, as represented by block 816 in FIG. 8. A usage metric violation notification may be issued, such as to CPU 602 or to BMC CPU 626 in BMC 620, as represented by block 818, after which the command is passed to behavior evaluation circuit 660, as represented by block 820 in FIG. 8.

Also, if a received command is not determined in block 814 to violate a usage metric, it is passed to decision block 820, representing the evaluation performed by behavior evaluation circuit 660 in FIG. 6.

In block 820, the command is subjected to evaluation in behavior evaluation circuit 660 in FIG. 6. Behavior evaluation involves applying one or behavior metrics to a received command in order to determine whether a command reflects an undesirable pattern of behavior during operation of system 600. What constitutes undesirable behavior patterns is thus determined by the definitions of one or more behavior metrics implemented by behavior evaluation circuit 660, as will be hereinafter described in further detail.

If, in block 820, a received command is evaluated according to one or more behavior metrics and a violation of a behavior metric is determined to have occurred, the received command is rejected, as represented by block 822 in FIG. 8. A usage metric violation notification may be issued, such as to CPU 602 or to BMC CPU 626 in BMC 620, as represented by block 824, after which the command is passed to issue circuit 662, as represented by block 826.

Also, if a received command is not determined in block 820 to violate a usage metric, it is passed to decision block 826, which determines whether the received command was rejected upon evaluation in decision blocks 804, 814, or 820. If not, the command is passed to issue circuit 662 as represented by block 828 in FIG. 8. Issue circuit 662 is implemented to issue only those commands that have not been rejected based on evaluation in authentication circuitry 650 or access monitor circuitry 656.

As noted above, access monitor circuitry 656 functions to apply one or more access metrics (usage metrics and behavior metrics) to received commands. As such, access monitor circuitry 656 is capable of identifying otherwise legitimate commands (i.e., commands not rejected based on evaluation in authentication circuitry 650) which are nonetheless potentially malicious or otherwise undesirable.

Each access metric, as applied by access monitor circuitry 656 in the example of FIG. 6, may be defined as function of a number of variables, including the type and attributes of a command, as well as access statistics maintained in access statistics store 637. Appropriately defined usage and behavior metrics (reflected by access monitor block 656 and including block 658 and 660 in the example of FIG. 6) facilitate identification of particular patterns of access behavior which may be occurring and/or exhibited by a command or sequence of commands. Usage metrics may be primarily quantitative, such as the number of accesses occurring within a given time period. Behavior metrics may relate to patterns of access behavior of which a particular command may be a part. Using historical, temporal, and/or quantitative statistics, such as those maintained in access statistics store 637, an access behavior metric may take into account the relationship of one command to one or more previous commands. For example, a metric may be defined to determine whether a READ command has been issued for a location issued following an ERASE command for the same location, when no intervening WRITE/PROGRAM command has occurred. Another behavior metric may be defined to determine that accesses across unrelated address ranges in the memory are occurring. Essentially any pattern of usage or behavior may be detected with an appropriately defined metric. In fact, behaviors which are clearly indicative of malicious accesses intended to cause premature failure of a flash memory by accelerating access wear processes may be relatively straightforward to detect. This is in part due to the necessity of highly repetitive behaviors occurring for such a malicious objective to be accomplished.

The following is a discussion of a non-exhaustive list of some example metrics, such as may be applied by access monitor circuitry 656 in the example of FIG. 6.

A metric which may be defined and applied by access monitor circuitry 656 is a one whereby a determination is made whether execution of a command under evaluation would cause a predefined limit on the number of accesses to flash ROM 642 to be exceeded. Such a threshold metric may incorporate an access threshold parameter and a temporal parameter. For example, the usage threshold metric may be defined as a function of access statistics maintained in access statistics store 637, and in particular as a function of a running count of accesses over a specified period of time. For example, a usage metric permitting only a specified, limited number of flash memory accesses to occur within a specified time period. The metric reference parameters for determining whether a violation of the metric has occurred may be stored in registers 636 as previously described. The metric, being a function of a running count of accesses, may be evaluated for each access, and a metric violation may be indicated if, upon evaluation of an access command, the running tally is found to exceed the metric's reference values 639 (stored in registers 636) during the metric's time period (also stored in registers 636). Different reference parameters may be defined for different types of memory accesses, and may be defined differently based upon particular address ranges within flash ROM 642. Any running count statistics maintained in access statistics store 637 may be periodically reset or otherwise recalibrated according to a desired schedule and depending upon the metric definitions for which the count statistics are used.

A metric may establish a limit on the number of times a particular sector or page of flash ROM 642 is accessed within a specified time period. Still another example of usage metric may require a minimum time interval to elapse between any two successive flash ROM accesses.

A metric may be defined to identify a complete valid flash sequence, such as a sequence consisting of a monotonically increasing sequence of "erase sector" commands, followed by page program commands. If such a sequence occurs more frequently than a predefined threshold over a predetermined time period, access monitor circuitry 656 may identify the sequence as malicious. For example, the malicious code may purposefully alternate a firmware update between two valid flash images repeatedly in an attempt to wear out the part and exceed the number of writes per cell.

A metric may be defined to identify a "focused" flash command sequence consisting of concentrated activity in a subset of the valid flash region. For example, malicious code may target a sensitive flash sector by issuing repeated erase/write commands. The erase/write commands would not appear as monotonically increasing sector/page locations and instead concentrate on a particular sector/page or "portion" of the valid firmware area. Again, there may be a temporal component for this metric, as well as a "sequence" component. That is, the commands may be issued in a sequence identifiable as not serving a legitimate operational purpose, and it may be repeated too many times within a predetermined time period. Each command in the sequence, however, may be deemed allowable/legal (at least according to criteria evaluated in authentication circuitry 650 in the example of FIG. 6), yet may nevertheless constitute malicious code if performed correctly.

A metric may be defined to identify allowable commands that don't follow an expected sequence.

A metric may be defined to identify allowable commands issued incorrectly. For example, an ERASE sector command is normally followed by one or more STATUS command reads to ensure that the ERASE command is finished before any further commands may be issued. If further commands are issued, the flash component may malfunction since essentially its design and usage speciofication has been violated. This may result in a corrupted part, damaging the ability for BMC 620 and/or system 600 from booting, leading to a "denial of service" scenario. In such a case, access monitor circuitry 656 may monitor not just the commands that are issued but also the result of those commands. For example, an ERASE command followed by one or more STATUS commands, with the last STATUS read returning GOOD status)

In each of the examples in the foregoing non-exhaustive list, the activity detections may be based on identification of one or more definable address ranges. Different rule sets may apply to different ranges. For example, there may be one or more predetermined ranges defined for firmware 646 where activity described herein may apply, while there may be other ranges in which certain behaviors might legitimately expected to occur.

A malicious attack intended to disable a flash ROM may involve repeated WRITE/PROGRAM or ERASE commands, such as with a program loop. The memory locations in accessed by a sequence of commands may be indiscriminate or may follow a sequence that does not reflect a legitimate purpose. The addresses accessed over a sequence of access commands may span a range of locations that does not reflect a legitimate purpose. For example, since firmware 646 typically occupies a specified range within flash ROM 642, a series of access commands which includes but is not limited to the address range of firmware 646, would not be consistent with a legitimate firmware update. Moreover, since legitimate firmware updates typically do not occur repetitively, an unusually repetitive sequence of commands would also not be consistent with legitimate purposes, As another example, a sequence of commands accessing sequential locations over the entire address range of flash ROM 642 would constitute a suspicious access behavior pattern, as would sequences of commands to the same location or range of locations. As another example, the types of access commands in a sequence of accesses may constitute suspicious or undesirable behavior. For example, an erase access followed thereafter by a read access to the same location may be considered illogical and thus signal undesirable behavior. Using such reasoning, various behavior metrics may be defined and applied; the foregoing is not an exhaustive list of some example behavior metrics.

As previously noted, usage statistics store 637 may include one or more counters 643, and further may be provided with a clock (CLK) signal 645. Different counters 643 may be utilized to maintain running tallies of the occurrence of access cycles or other events. In cooperation with clock signal 645, these counters 643 may maintain access counts for any desired period of time. Counts may be reset periodically in order to maintain statistics compatible with the behavior and access metrics that are defined. The Clock signal 645 may be utilized to provide "time stamp" information for access statistics recorded in usage statistics store, in order for usage and behavior metrics to incorporate temporal parameters.

Figure 9:
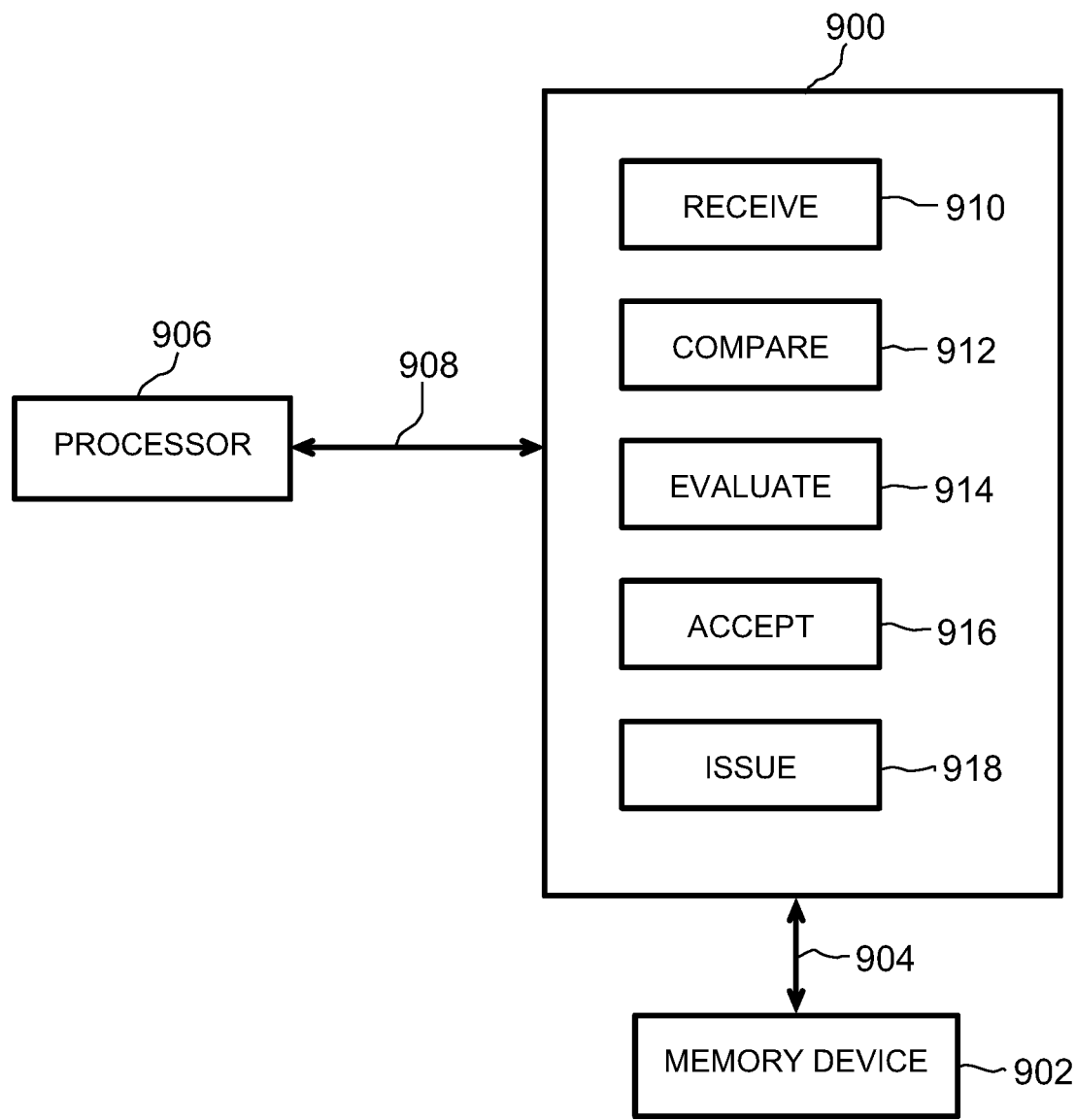
FIG. 9 is a block diagram showing another example tangible, non-transitory, computer-readable medium that stores code configured to secure a flash memory device in accordance with the present disclosure.

FIG. 9 is block diagram showing an example tangible, non-transitory, computer-readable medium 900 that stores or otherwise embodies code configured to secure a memory device 902 which may be a flash memory device, for example, in accordance with the present disclosure. As described herein, memory device 902 may be in a ROM associated with a BMC CPU, such as flash ROM 642 associated with BMC CPU 626 in the example of FIG. 6. The computer readable medium 900 may access memory device 902 via a memory bus 904. In other examples, the code embodied by medium 900 may be hard wired into logic circuits such as with an ASIC or other dedicated circuitry, into a BMC or a memory or disk controller. The computer-readable medium 900 may be accessed by a processor 906, such as a BMC CPU, over a computer bus 908 and may embody code configured to perform the methods described herein.

The various components discussed herein may be implemented using the computer-readable medium 900. The components may include various modules to secure and protect the memory device 902 from unauthorized access and malicious attacks. The receive module 910 may receive an access command for memory device 902 from processor 906 via computer bus 908. The compare module 912 may compare a command received in module 910 to a list of commands in registers or other memory locations. Any command received in module 910 that does not match an authorized command in the registers may be rejected and thus not issue to memory device 902. Conversely, any received command that matches a command in the registers, may be passed to an evaluate module 914 for evaluation of the received command according to one or more access metrics defined to identify malicious access commands or patterns of access commands. If a received command is evaluated in module 914 and determined to violate an access metric, the received command may be rejected and thus not issue to memory device 902. However, if no metric violation is determined in module 914, the command may be accepted in module 916 and passed to an issue module 918 for issuance of the access command to memory 902.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to. . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The examples described herein may be susceptible to various modifications and alternative forms. It should be understood that the techniques are not intended to be limited to the particular examples disclosed herein. Indeed, the examples include all alternatives, modifications, and equivalents falling within the true spirit and scope of the appended claims.

What is claimed is:

1. A method for securing a memory device of a computing system, comprising:
   receiving a plurality of access commands in a sequence;
   for each received respective access command in the sequence:
      updating a store of access statistics with statistics for the respective access command, and
      evaluating the respective access command in the sequence according to an access metric to derive a metric value for the respective access command, wherein the access metric is defined as a function of at least one statistic of the access statistics;
   determining whether a pattern comprising different types of access commands of the plurality of access commands in the sequence deviates from an expected behavior pattern based on statistics in the store of access statistics; and
   selectively executing the plurality of access commands based on a comparison of the metric value for each respective access command of the plurality of access commands and an access metric reference value, and based on determining whether the pattern of the different types of access commands deviates from the expected behavior pattern.

2. The method of claim 1, wherein the access statistics include temporal statistics.

3. The method of claim 2, further comprising defining an access metric to identify a particular access pattern of the plurality of access commands in the sequence.

4. The method of claim 3, wherein the particular access pattern comprises a sequence of access commands issued within a predefined time interval and including a number of accesses which exceeds a predefined threshold number.

5. A system comprising
   a memory controller to communicate with a memory device via a serial bus, the memory controller to receive a plurality of memory access commands in a sequence;
   a store of access statistics coupled to the memory controller; and
   a register, coupled to the memory controller, for storing an access metric reference value;
   the memory controller to:
      evaluate each respective memory access command in the sequence according to an access metric defined as a function of at least one statistic in the store of access statistics, to derive a metric value for the respective memory access command,
      determine whether a pattern comprising different types of memory access commands of the plurality of memory access commands in the sequence deviates from an expected behavior pattern based on statistics in the store of access statistics, and
      selectively execute the plurality of memory access commands based on a comparison of the metric value derived for each respective access command of the plurality of memory access commands with the access metric reference value, and based on determining whether the pattern of the different types of memory access commands deviates from the expected behavior pattern.

6. The system of claim 5, wherein the memory controller comprises an application-specific integrated circuit.

7. A non-transitory machine-readable storage medium comprising instructions that upon execution cause a memory controller to:
   receive a plurality of access commands in a sequence from a processor;
   responsive to each respective access command in the sequence:
      update an access statistics store with statistics for the respective access command,
      evaluate the respective access command according to an access metric defined as a function of at least one statistic in the access statistics store, to derive an access metric value for the respective access command, and
      compare the access metric value for the respective access command to a metric reference value;
   determine whether a pattern comprising different types of access commands of the plurality of access commands in the sequence deviates from an expected behavior pattern based on statistics in the access statistics store; and
   selectively issue the plurality of access commands to a memory device based on the comparison of the access metric value for each respective access command of the plurality of access commands and the metric reference value, and based on determining whether the pattern of the different types of access commands deviates from the expected behavior pattern.

8. The method of claim 1, wherein determining that the pattern of the different types of access commands deviates from the expected behavior pattern comprises determining that a read command of a storage location in the memory device follows an erase command of the storage location in the memory device.

9. The method of claim 1, wherein determining that the pattern of the different types of access commands deviates from the expected behavior pattern comprises determining that a read command of a storage location in the memory device follows an erase command of the storage location without an intervening write command of the storage location.

10. The method of claim 1, wherein the selectively executing the plurality of access commands comprises:
   rejecting a first access command of the plurality of access commands in response to a metric value for the first access command violating a minimum time interval between successive accesses of a storage location in the memory device.

11. The system of claim 5, wherein the memory controller is to determine that the pattern of the different types of memory access commands deviates from the expected behavior pattern based on determining that a read command of a storage location in the memory device follows an erase command of the storage location in the memory device.

12. The system of claim 5, wherein the memory controller is to determine that the pattern of the different types of memory access commands deviates from the expected behavior pattern based on determining that a read command of a storage location in the memory device follows an erase command of the storage location without an intervening write command of the storage location.

13. The system of claim 5, wherein the memory controller is to determine that the pattern of the different types of memory access commands deviates from the expected behavior pattern based on determining that a relationship between the different types of memory access commands in the sequence violates an expected relationship.

14. The system of claim 5, wherein the memory controller is to selectively execute the plurality of memory access commands by:
rejecting a first memory access command of the plurality of memory access commands in response to a metric value for the first memory access command violating a minimum time interval between successive accesses of a storage location in the memory device.

15. The non-transitory machine-readable storage medium of claim 7, wherein the instructions upon execution cause the memory controller to selectively issue the plurality of access commands to the memory device by:
rejecting a first access command of the plurality of access commands in response to a comparison of an access metric value for the first access command violating the metric reference value, or in response to the pattern of the different types of access commands deviating from the expected behavior pattern.

16. The non-transitory machine-readable storage medium of claim 15, wherein the instructions upon execution cause the memory controller to selectively issue the plurality of access commands to the memory device by:
allowing issuance of a second access command of the plurality of access commands to the memory device in response to a comparison of an access metric value for the second access command not violating the metric reference value, and in response to the pattern of the different types of access commands not deviating from the expected behavior pattern.

17. The non-transitory machine-readable storage medium of claim 7, wherein the instructions upon execution cause the memory controller to determine that the pattern of the different types of access commands deviates from the expected behavior pattern based on determining that a read command of a storage location in the memory device follows an erase command of the storage location in the memory device.

18. The non-transitory machine-readable storage medium of claim 7, wherein the instructions upon execution cause the memory controller to determine that the pattern of the different types of access commands deviates from the expected behavior pattern based on determining that a read command of a storage location in the memory device follows an erase command of the storage location without an intervening write command of the storage location.

19. The non-transitory machine-readable storage medium of claim 7, wherein the instructions upon execution cause the memory controller to determine that the pattern of the different types of access commands deviates from the expected behavior pattern based on determining that a relationship between the different types of access commands in the sequence violates an expected relationship.

20. The non-transitory machine-readable storage medium of claim 7, wherein the instructions upon execution cause the memory controller to selectively execute the plurality of access commands by:
rejecting a first access command of the plurality of access commands in response to an access metric value for the first access command violating a minimum time interval between successive accesses of a storage location in the memory device.

* * * * *